H. R. WELLS.
INTERNAL COMBUSTION ENGINE.
APPLICATION FILED NOV. 10, 1915.
1,364,166.
Patented Jan. 4, 1921.
8 SHEETS—SHEET 1.
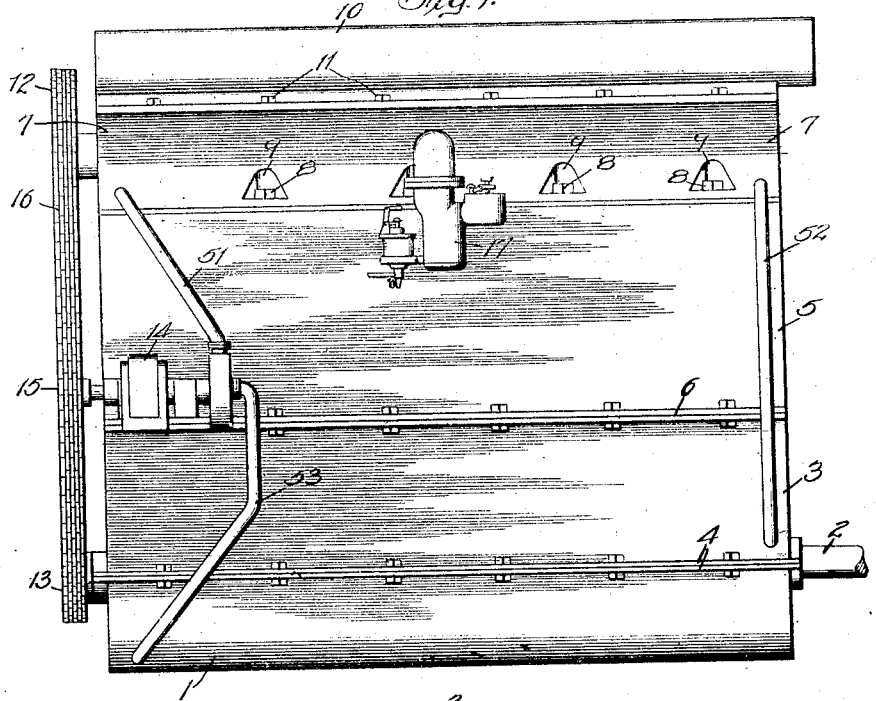
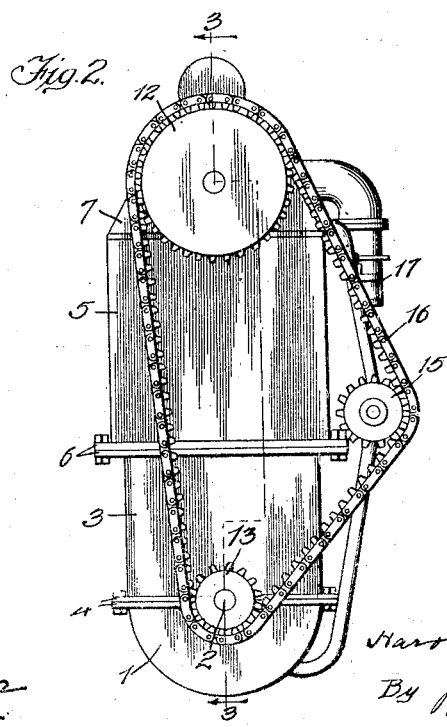
Witnesses:
Inventor:
Harold R. Wells
By Wallace R. Lane Atty.

H. R. WELLS.
INTERNAL COMBUSTION ENGINE.
APPLICATION FILED NOV. 10, 1915.

1,364,166.

Patented Jan. 4, 1921.
8 SHEETS—SHEET 2.

Witnesses:
Robert H. Weir
Sebastian Hinton

Inventor:
Harold R. Wells
By Wallace R. Lane
Atty.

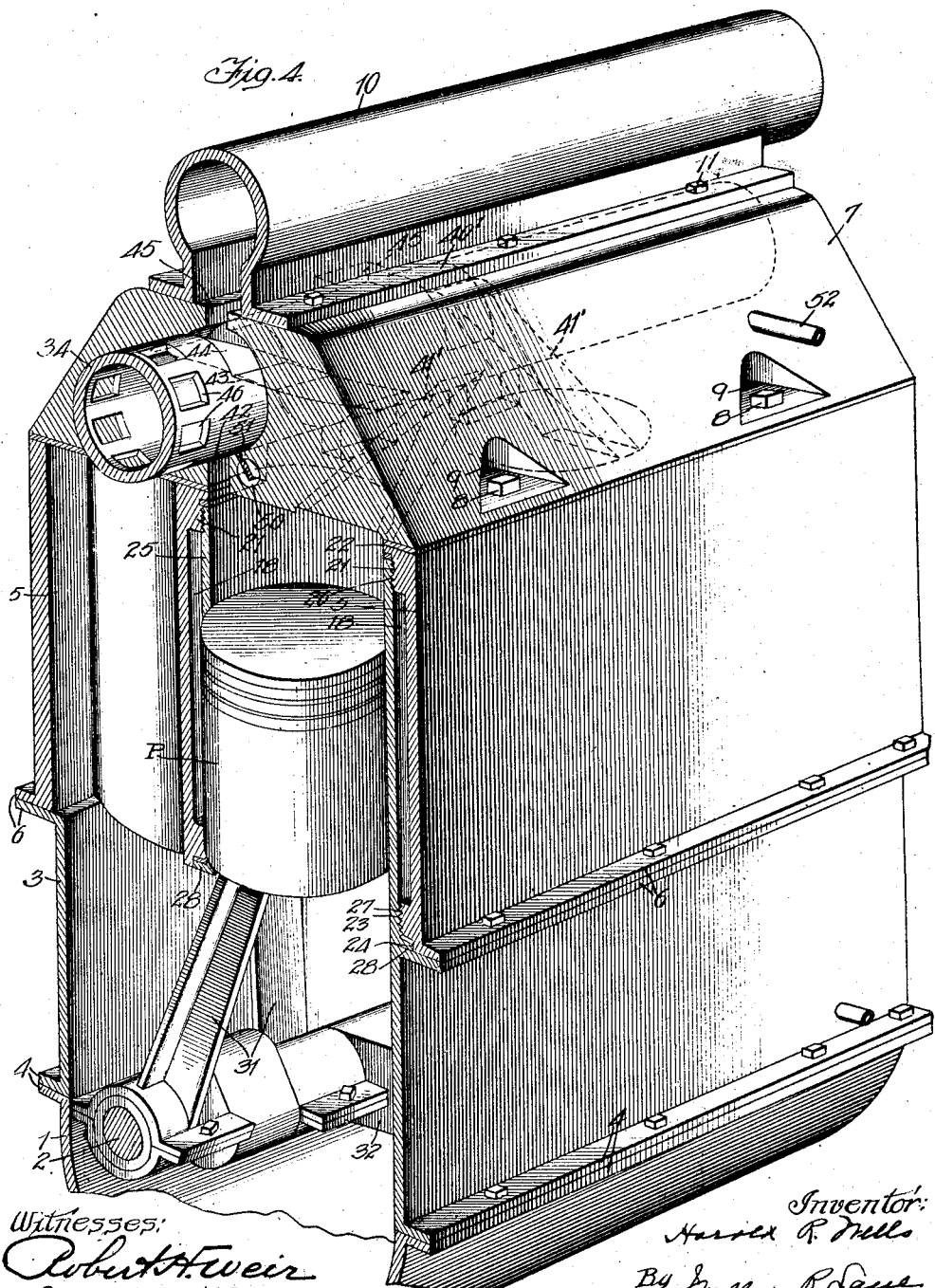

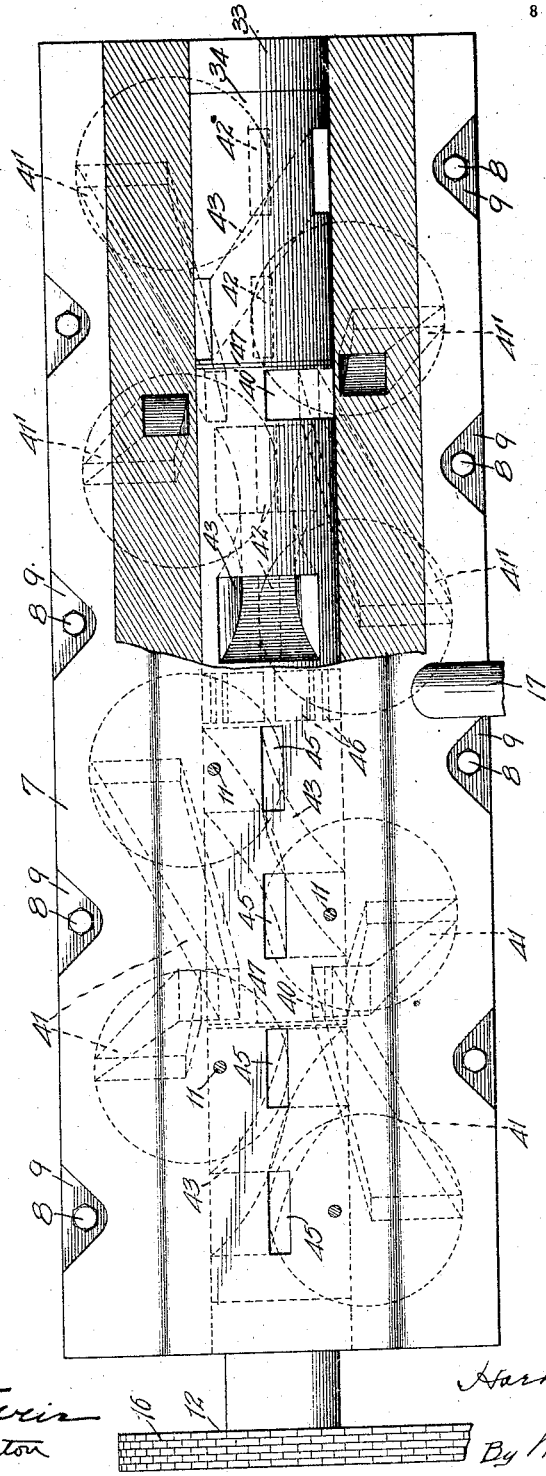

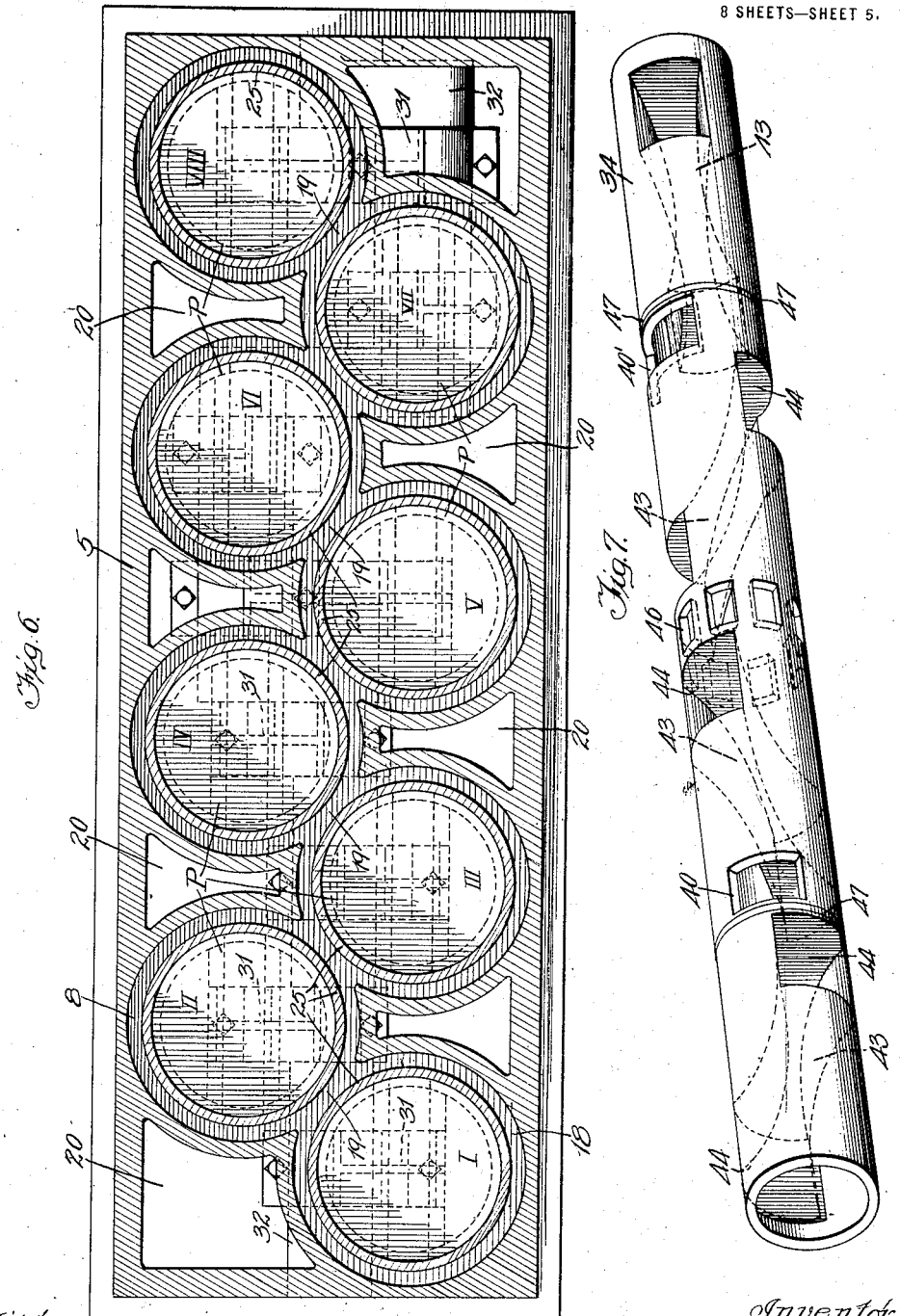

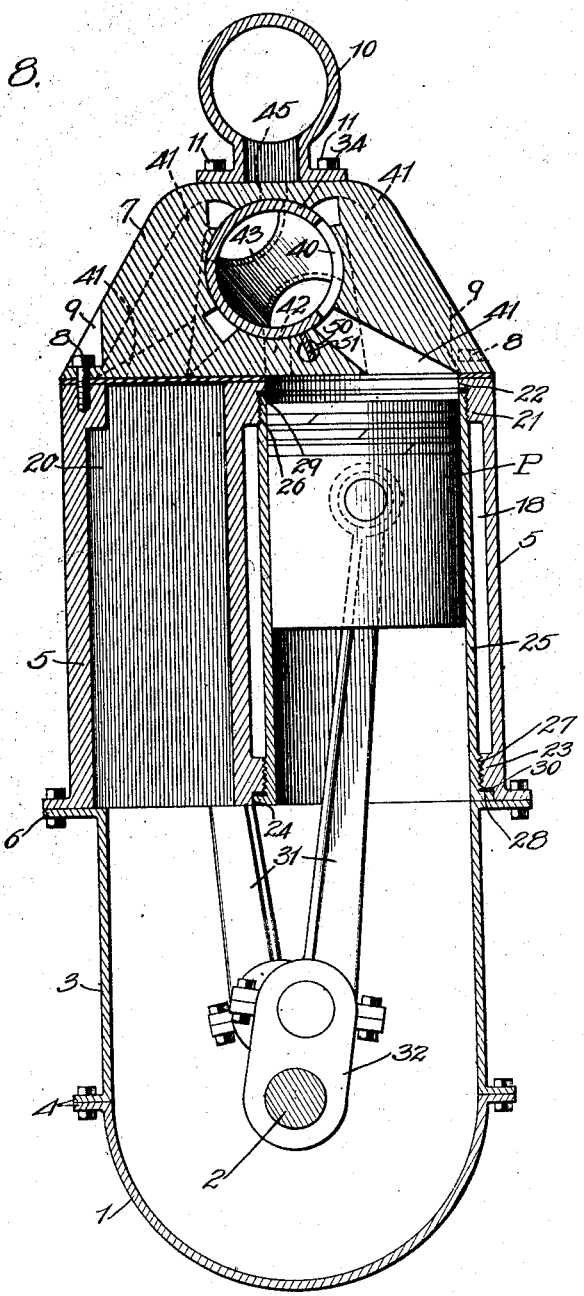

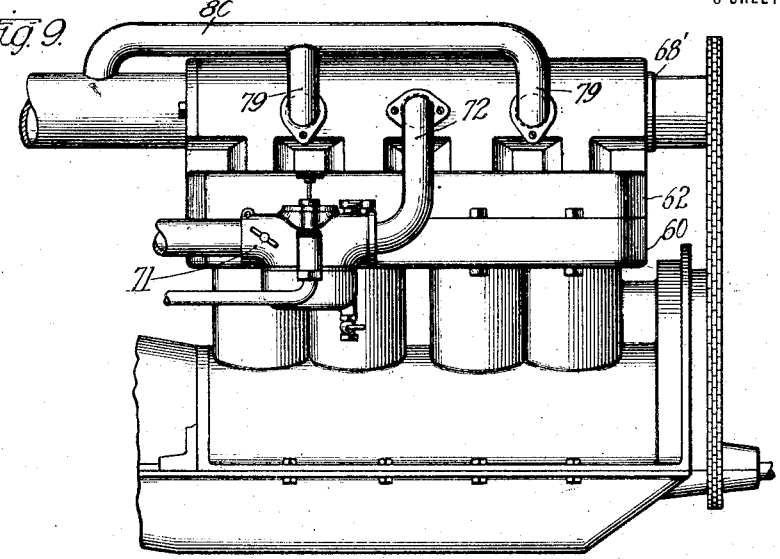
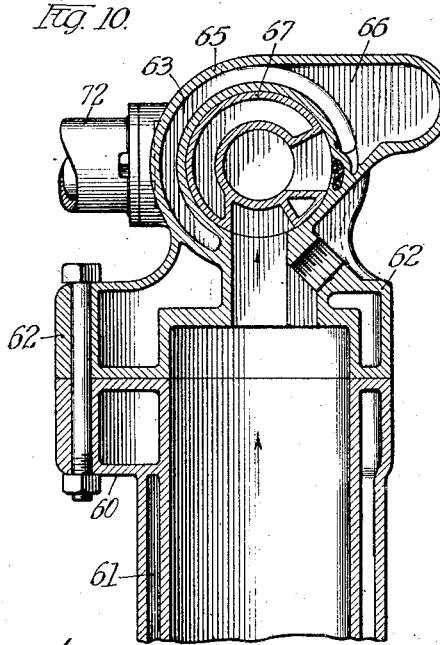
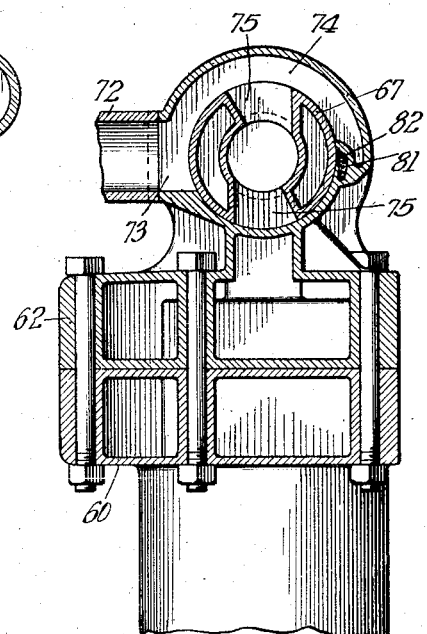

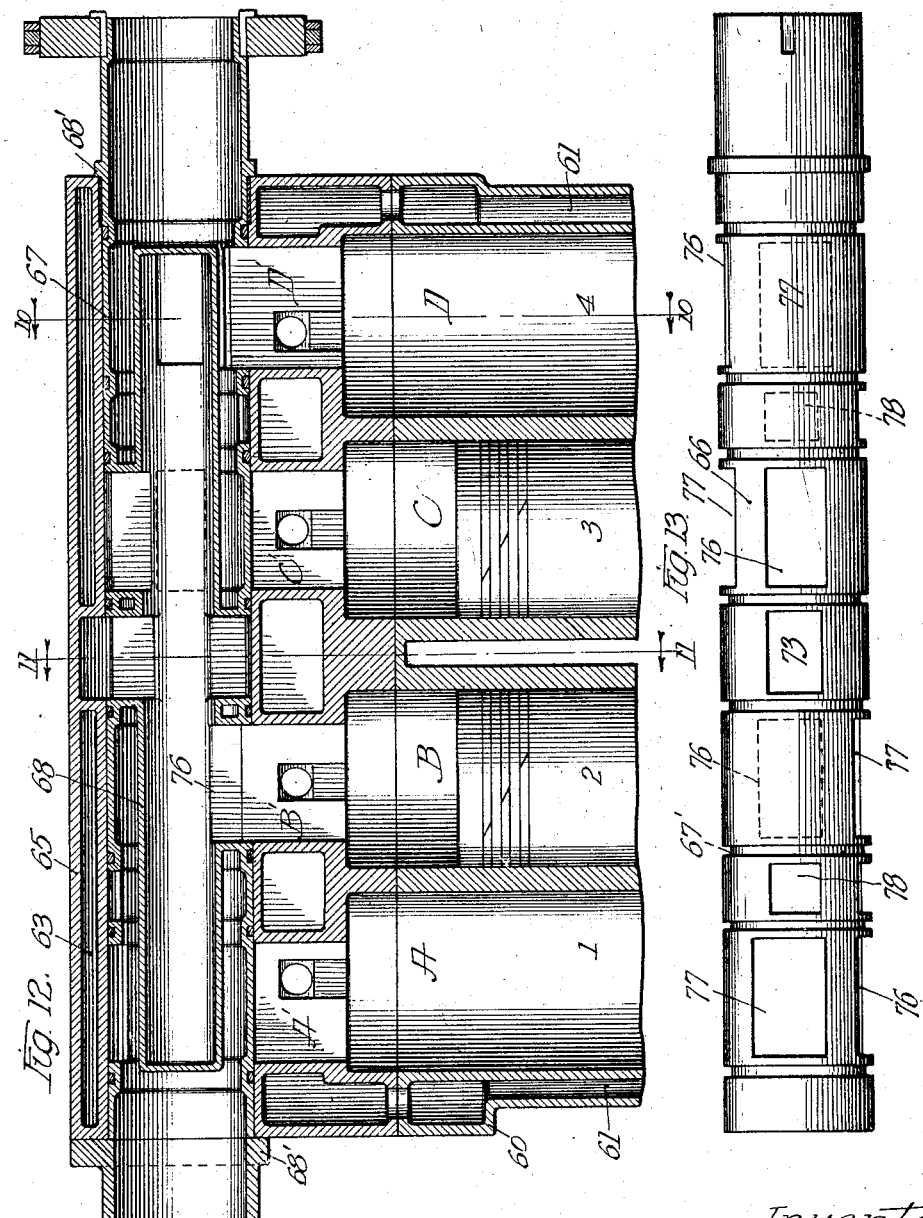

UNITED STATES PATENT OFFICE.

HAROLD R. WELLS, OF DES MOINES, IOWA.

INTERNAL-COMBUSTION ENGINE.

1,364,166.   Specification of Letters Patent.   Patented Jan. 4, 1921.

Application filed November 10, 1915. Serial No. 60,633.

*To all whom it may concern:*

Be it known that I, HAROLD R. WELLS, a citizen of the United States, residing at Des Moines, in the county of Polk and State of Iowa, have invented certain new and useful Improvements in Internal-Combustion Engines, of which the following is the specification.

This invention relates to engines, and particularly to internal combustion engines. Internal combustion engines of the prior art, in so far as I am aware, have generally been provided with valve systems which are more or less complicated, require individual attention and are apt to get out of order. Furthermore, in internal combustion engines of the prior art the removal and replacement of the valve has generally been a tedious task.

It is an object of this invention to provide an internal combustion engine of simple and economical construction which may be readily set up or disassembled, and which, by reason of the simplicity of its construction, is more reliable than those heretofore upon the market.

It is another object of this invention to provide an integrally cast cylinder casing into which the individual cylinders may be assembled and placed in a simple and easy fashion.

It is another object of this invention to provide a top piece adapted to cover the entire cylinder block and containing individual cylinder heads together with outlet and discharge passages and a single rotary valve for controlling the operation of each of the cylinders, whereby the entire top piece may be removed as a single unit.

It is another object of this invention to provide a novel valve system comprising a non-leakable valve not depending upon cams for its operation, but positively driven; and to modify the construction of the various inlet and outlet passages for the various cylinders involved in a multiple cylinder engine.

It is a further object of this invention to provide a rotary cylinder valve for controlling each of the cylinders of an internal combustion engine and to pass the intake gases into the interior of said valve and therefrom into the individual cylinders at the proper times and to provide passages spanning said rotary valve through which the discharge and exhaust gases from the cylinders are passed.

While the advantages above mentioned are the most important ones obtained by my invention, the invention, at the same time, contains many other important advantages and novel points, as will clearly appear in the specification to follow:

In the drawings:

Figure 1 is a plan view of an engine constructed according to my invention.

Fig. 2 is an end elevation thereof.

Fig. 4 is a perspective view partly in section showing the relation of the cylinders to the rotary valve.

Fig. 5 is a top plan view partly in section showing the arrangement of the various passages coöperating with the rotary valve.

Fig. 6 is a horizontal sectional view showing the arrangement of the cylinders.

Fig. 7 is a detailed perspective view of the rotary valve.

Fig. 8 is a vertical sectional view through the complete engine.

Figs. 9 to 13 show a modification of my invention particularly designed to be applied upon a Ford engine though capable, obviously, of other applications.

Fig. 9 is an elevation of this modification.

Fig. 10 is a sectional view showing the parts in position to exhaust one of the cylinders.

Fig. 11 is a sectional view showing the parts in position to supply one of the cylinders.

Fig. 12 is a sectional view along the cylinders.

Fig. 13 is a plan view of the valve.

Figure 3:
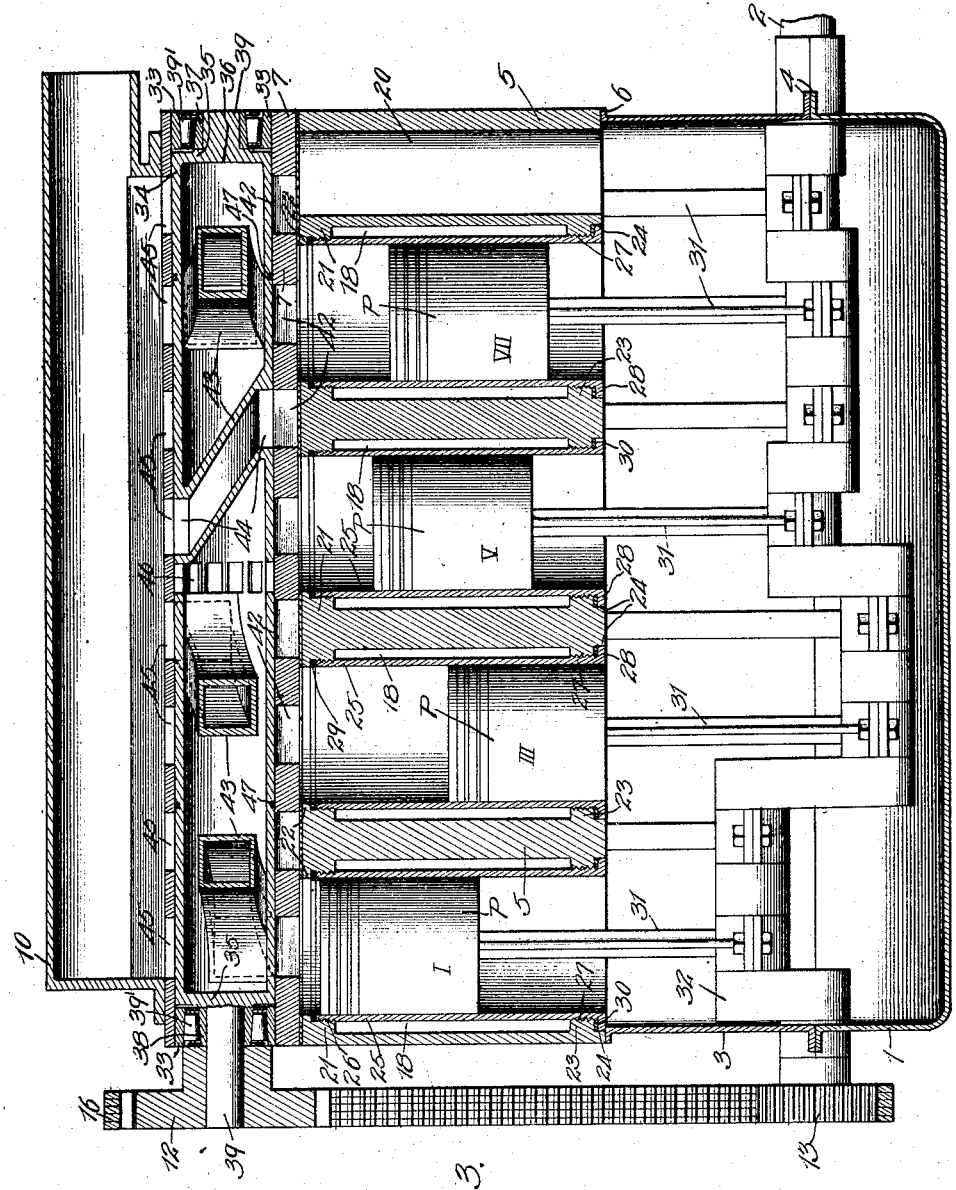
Fig. 3 is a sectional view upon line 3—3 of Fig. 2.

I will first describe the general arrangement of the engine, reference being had to Figs. 1 and 2.

1 represents the bottom casing or bed plate of the engine which has bearings for the lay or crank shaft 2 and is made semi-cylindrical and adapted to contain lubricant for a splash lubricating system. Upon the casing 1 is mounted an oval columnar casing 3 firmly bolted to the casing 1 by means of the coöperating flanges 4. The casing 3 incloses the connecting rods and at its upper end supports the cylinder block 5 by means of the flanges 6 which are bolted together as indicated. The cylinder block will be more fully described hereinafter. Suffice it to say here that it contains all of the cylinders, in the particular modification here chosen for illustrative purposes, eight.

Upon the top of the cylinder block 5 is mounted the cover block 7 which is firmly bolted to the cylinder block by bolts 8 which are set into the cut away parts 9 in the top piece, as indicated in Figs. 1 and 4. The cover block 7 supports the exhaust manifold 10 secured to it by bolts 11. In the cover block 7 is mounted a rotary valve, hereinafter more fully described, which has bearings in the cover block and at one end carries a gear 12. Upon the crank shaft 2 is a gear 13 one-half the size of the gear 12. Upon the side of cylinder block 5 is mounted an oil pump, generally indicated in Fig. 1 as 14, the shaft of which is driven by the gear 15. A silent chain 16 passes over the gears 12, 13 and 15 driving the oil pump, and, it should be noted, driving the rotary valve at one-half the speed of the crank shaft. 17 indicates a carbureter attached to the side of the engine, the specific form of which is not essential to my invention, any satisfactory well known form being available.

The cylinder block (see Fig. 6) is preferably cast in one piece and is provided with a plurality of vertically extending cylindrical chambers 18, in this instance eight being shown, and these chambers are preferably arranged in staggered relation so as to be symmetrical with the crank shaft and intersect each with the adjoining ones, as indicated at 19, to provide for water circulation. The parts of the cylinder block not occupied by the cylindrical chambers just mentioned are cored out in casting, as indicated at 20, to reduce the weight. The chambers 18 are constricted at their tops by the threaded shoulders 21 above which are the extensions 22 the tops of which lie flush with the top of the cylinder block. The chambers 18 are constricted at their bottoms by the integrally formed collars 23, below which are the countersinks 24 to receive the bottom flanges of the cylinders. The cylinders 25 are threaded at their tops, as indicated at 26 and adjacent their bottoms, as indicated at 27, and are provided with bottom flanges 28. The cylinders 25 are screwed into the block 5 so that the threads upon the top and adjacent the bottom of the cylinders engage with the constricted threaded portions 21 and 23 in the block 5, the gaskets 29 and 30 serving to make the heads tight. By this construction it will be seen that there is provided a set of smooth, cylindrical apertures passing entirely through the block 5 and that the cylinders themselves may be readily individually removed. The space between the chambers 18 and the cylinders 25 and between the top and bottom threaded constricted portions comprise the interconnecting water jackets for cooling.

Pistons P of any prefered form operate in cylinders 25 and operate connecting rods 31.

A crank 32 drives the crank shaft 2. By reference to Fig. 8 it will be observed that the two cranks 32 of adjoining cylinders are slightly offset and that each crank is so offset that in the position indicated in Fig. 8 both of the connecting rods 31 are in a true center line as regards the pistons P and the cranks 2, at the same time.

This arrangement makes a much more smooth and more efficient drive and reduces the vibration.

I will now describe an important feature of my invention which consists in the valve mechanism whereby the operation of the cylinders is controlled.

In the embodiment of the invention herein selected for illustrative purposes, I have shown an eight cylinder engine, and this number of cylinders, by reason of the fact it permits the same number of cylinders to be offset to either side of the vertical plane of the crank shaft and thus forms a sub-combination longitudinally into equal groups, is well adapted to be employed in connection with my invention. Of course, however, I do not wish to be understood as limiting the invention to application in an eight cylinder engine, or engines of any number of cylinders, the invention being perfectly applicable by modifications involving a mere calculation as to the spacing of parts, etc. to any multiple cylinder engine.

Covering the top of the block 5 is a gasket having holes therein to correspond with the cylinder apertures. Mounted upon this gasket and firmly bolted to the block 5, as above described, is the cover block 7 which contains the valve mechanism of the engine. The block 7 extends the entire length of the engine and in an end elevation is dome shaped and carries at its top the exhaust manifold 10. A cylindrical aperture is formed through the block 7 from one end to the other. At the ends of this aperture are mounted the beveled collars 33. Mounted in the cylindrical aperture between these collars is the rotary valve 34 comprising a cylinder closed at its ends, as indicated at 35, and provided at one end with a journal 36 having mounted thereon a tapered collar 37, and at the other end with a hollow tapered journal 38 in which is rigidly mounted the shaft 39 upon which is secured the driving sprocket wheel 12, hereinbefore described. The tapered collar 37, the tapered journal 38 and the collars 33 afford bearing surfaces for Timkin bearings 39'. Obviously, any other satisfactory form of bearings could be substituted. It will be apparent from the description so far, that the rotary valve comprising the cylinder 34 having closed ends is revolved in the cover block 7 at one-half the speed of the crank shaft. The valve 34 is provided with one intake port 40 for each sub-group of cylinders; in this instance (eight cylinders being shown divided into two groups of four cylinders each) with two intake ports 40, as clearly shown in Fig. 7. In the cover block 7 are passages 41 leading from the portion of the block 7 which forms the head of each cylinder to points equally spaced about the rotary valve 34 and in position to be successively uncovered by the intake ports 40. In the present instance cylinders I—II—III—IV intake through ports 41, the mouths of which are quartered about a ring so as to be successively uncovered by the intake port 40 (to the left in Fig. 7). Similarly, cylinders V—VI—VII—VIII are connected by passages 41' whose mouths lie in a ring adapted to be uncovered in succession by the intake port 40' (on the right in Fig. 7). The intake port 40' is spaced 45° from the intake port 40 for a reason to be described later.

Adjacent the median line of the cover block 7 are a series of discharge openings 42, one for each cylinder, which extend vertically upward and have mouths lying in a line along the bottom of the cylindrical valve 34. Spanning the rotary valve 34 are a plurality of tubes 43 having flared mouths 44, so arranged that their median lines are diametrical planes and are inclined longitudinally so that while in one position the mouth at one end of the tube 43 will uncover and register with the discharge port 42 of one cylinder, but when the valve has rotated 180° from this position the mouth at the opposite end of the tube 43 will register with and uncover the discharge port 42 leading from the adjoining cylinder. In this instance four of these tubes 43 are provided, the first operating to discharge cylinders I and II, the next to discharge cylinders III and IV, the next to discharge cylinders V and VI and the fourth operating to discharge cylinders VII and VIII. Diametrically opposite to the ports 43 and lying along the top of the rotary valve 34 are a set of exhaust ports 45. These ports are so placed that the first tube 43, for instance, will, in one position, connect the second opening 45 with the discharge 42 from the first cylinder, and when the valve is rotated 180° the same tube 43 will connect the discharge opening 42 from the cylinder II with the first discharge port 45. All of the discharge ports 45 open into the exhaust manifold 10, above described. The rotary valve 34 is provided at its mid portion with a ring of ports 46 through which the gas is driven into the interior of the valve from the carbureter 17. I consider it an important feature of the invention that the gas is fed centrally into the interior of the rotary valve 34 because this leads to the equal and even distribution of the gas applied to the cylinders.

The firing order for which the ports have been placed in the embodiment disclosed in the drawings is 1—5—4—8—2—6—3—7, cylinders V to VIII being advanced 45° by the advanced location of the intake port 40' controlling the admission of gas to these cylinders. The discharge tubes 43 for cylinders V to VIII are correspondingly placed so that adjoining cylinders, for instance, I and V, will exhaust at the proper times and at each 180° of revolution of the rotary valve or 360° of the crank shaft. Inasmuch as the valve is driven at half the speed of the crank shaft it will be apparent that there will be an impulse at every 90° of the crank or at every 45° of the valve shaft.

The rotary valve 34 is provided with a plurality of piston rings 47, many of which have not been shown in Fig. 7 in order to avoid confusion and the undue crowding of the drawings. These piston rings prevent leakage along the valve and cause a smoother operation thereof.

I have provided a lubricating system for the rotary valve 34, comprising a channel 50 extending the entire length thereof and having a slot leading therefrom whose mouth opens directly upon the surface of the valve 34. A wick 51 is seated in the slot and rubs against the valve 34 along its whole length. The channel 50 is connected by pipes 51 and 52 with an oil pump 14 and thus included in the oil circulation whereby oil is taken out of the bottom casing 1 by pipes 53, passes through pump 14, is forced in pipe 51 into and along the entire length of the channel 50 and returns through pipe 52 to the casing.

I wish to particularly point out the fact that the eight cylinders of my engine being located in the same vertical plane and symmetrically with respect to the crank shaft can all be operated without changing the center of gravity of the machine as a whole. This is particularly important in connection with flying machines. When the invention is to be applied to this use, or in any application in which lightness is a desirable feature, the entire casing structure, including casings 1, 3, 5, 7 and 10 may be cast from aluminum the construction being especially suitable to this method of manufacture—or the cylinder block alone may be made of aluminum.

The modification disclosed in Figs. 9 to 13 of the drawings embodies the same operative principles but shows a different form of valve and is designed to be applied to Ford engines.

In this modification 60 represents in general the cylinder block provided with water jackets 61 and with cylinders A—B—C—D. Mounted upon the cylinder block 60 is the valve casing 62 provided with a central cylindrical bore in which the rotary valve, hereinafter described, is mounted and with a water jacket 63 partially surrounding said cylindrical bore. The casing 65 is provided with a chamber 66 at its highest point in order to permit the application and operation of a thermo-siphonic cooling system such as is customarily employed in Ford engines. The water jacket 63 is not continuous but is bridged by gas inlet and exhaust passages, hereinafter to be described. Rotatably mounted in the cylindrical bore in the valve casing is a rotary valve, indicated in general by the reference character 66', provided with packing rings fitting in grooves 67' therein and held against longitudinal movement by the collar 68', one at either end of the valve casing.

The valve 66' comprises generally an outer cylindrical member 67 within which is mounted an inner cylindrical member 68. The outer cylindrical member 67 serves to discharge exhaust gases which pass along the annular space between it and the inner member 68 and may be discharged from either end of the tube 67, the discharge being also aided by special discharge ports, hereinafter to be described. The inner member 68 serves as the intake supply member from which gases are let into the various cylinders.

71 (Fig. 9) indicates in general the carbureter from which a tube 72 communicates with a port 73 in the casing 65. The port 73 opens into the passage 74 extending a little more than half way about the cylindrical bore of the valve casing and in open communication therewith. The valve 66 is provided with a plurality (in this instance two) of tubes or passages 75 spanning the annular space between the outer cylindrical member 67 and the inner cylindrical member 68. From an inspection of Fig. 11 it will be apparent that by this construction a supply of gas is continually fed to the interior of the member 68 from the carbureter.

In this modification the same passage serves both as an inlet and as an exhaust passage. The passages for the four cylinders are shown at A'—B'—C'—D'. Alined with each one of these passages is a tube or inlet passage communicating from the interior of inner member 68 across the annular space between the inner and outer ports and discharging outside the annular member. One of these discharges is shown at 75 in Fig. 12 in position to supply one of the cylinders.

By referring to Fig. 12 it will be seen that the firing order is 3—1—4—2, the passages 76 being correspondingly located about the valve. Separated 90° from each of the intake passages 76 is a discharge port 77 in the outer cylinder member 67, the exhaust gases passing out of the cylinder into the annular space between the outer member 67 and the inner member 68 and thence out from the ends of the valve 66. To promote easy discharge of the exhaust gases I provide additional relief ports 78 (two in number) in the outer cylindrical member 67 which communicate by discharge tubes similar to the intake tube 73 to pipes 79 which connect with the exhaust manifold 80.

It will be seen that the gases exhaust continually from the carbureter through passage 74 into the interior of the inner member 68 and from this member through passages 76 successively to the cylinders, passages 76 being spaced 90° apart so as to supply all of the cylinders upon each revolution of the valve. The cylinders successively exhaust into the annular space between the interior and outer cylindrical members, and the exhaust gases have an outlet outwardly from both ends of the valve and also through tubes 79 into the exhaust manifold 80.

A longitudinal passage 81 in the valve casing is provided with a wick 82 to lubricate the rotary valve along its entire length, in the manner described in connection with the other modification of the invention.

Having now described my invention, I claim:

1. In an internal combustion engine, a one piece cored block having a plurality of cylindrical walls extending entirely therethrough, the passages formed by said walls being constricted and screw threaded at their tops and bottoms, and engine cylinders screwed into said constricted portions whereby to provide a substantially uniform water jacket space around said cylinders.

2. In an internal combustion engine, a one piece cored block having a plurality of cylindrical walls extending entirely therethrough, the passages formed by said walls being constricted and screw threaded at their tops and bottoms, and engine cylinders screwed into said constricted portions whereby to provide a substantially uniform water jacket space around said cylinders, the water jacket spaces of adjacent cylinders circumferentially intersecting each other.

3. In an internal combustion engine, a casting comprising a block, a series of vertical passages through said block in staggered relation and each partially intersecting another, and being constricted at their tops and bottoms for the reception of cylinders.

4. In an internal combustion engine, a casting comprising a block having an aperture therethrough, an engine cylinder seated in said aperture, a casing having a plurality of cylinder heads therein, a rotary valve in said casing having a port, passages leading from said valve to said cylinder heads, the mouths of said passages being arranged so as to be successively uncovered by said port, a discharge passage in said casing, outlet passages from said cylinder heads, a tube spanning said rotary valve and adapted to periodically connect said discharge passage with one of said outlet passages during the revolution of the valve.

5. In an internal combustion engine, a casing having a plurality of cylinder heads therein, a rotary valve in said casing having a port, passages leading from said valve to said cylinder heads, the mouths of said passages being arranged so as to be successively uncovered by said port, a discharge passage in said casing, outlet passages from said cylinder heads, a tube spanning said rotary valve and adapted to periodically connect said discharge passage with one of said outlet passages during the revolution of the valve, said tube being inclined so as to connect different outlet passages with the same discharge passages during the same revolution of the valve.

6. In an internal combustion engine, engine cylinders, a casing adapted to fit upon a plurality of cylinders, a discharge passage in said casing, a discharge port for each cylinder, a rotary valve, a tube spanning said valve, said tube being inclined to the direction of the valve to connect different discharge ports with the discharge passage during a single revolution of the valve.

7. In an internal combustion engine, a series of cylinders, a casing having cylinder heads provided with intake and discharge passages and adapted to be removably secured upon the tops of said cylinders, a rotary valve having a port therein to supply gas to the intake ports in the cylinder heads, an intake pipe leading to said valve and a ring of ports in said valve to permit the entry of gas from said pipe to the valve, the outlet of said intake pipe and the coöperating ring of ports being located substantially centrally of the cylinders.

8. In an apparatus of the class described, a plurality of cylinders, a casing having cylinder heads for said cylinders, a rotary valve in said casing having a port therein, passages in said casing leading from a predetermined number of said cylinders and terminating in a plurality of ports arranged to be successively uncovered by said valve port, a supply pipe for leading gas to said valve, the outlet from said supply pipe to said valve being arranged substantially centrally thereof and feeding radially thereinto.

9. In apparatus of the class described, a plurality of cylinders, a casing having cylinder heads for said cylinders, a rotary valve in said casing having a port therein, passages in said casing leading from a predetermined number of said cylinders and terminating in a plurality of ports arranged to be successively uncovered by said valve port, a supply pipe for leading gas to said valve, the outlet from said supply pipe to said valve being arranged substantially centrally thereof, and tubes spanning said valve and periodically registering with outlet ports in the cylinder heads to discharge exhaust gases.

10. In an internal combustion engine, a plurality of engine cylinders, a casing having inlet and outlet ports and passages, a rotary valve in said casing adapted to coöperate with said ports and passages, said valve comprising a cylindrical member having ports adapted to coöperate with a plurality of cylinders and spanned by a tube, means for supplying incoming gas to the interior of said cylindrical member, the exhaust gases from a plurality of cylinders passing successively through said tube.

11. In an internal combustion engine, an engine cylinder, a casing adapted to be secured upon the tops of said engine cylinder, a rotary valve in said casing, a channel in said casing adjacent to and extending longitudinally said valve and means for introducing lubricant into said channel, and a wick in said channel and extending to contact with said valve to lubricate the same.

12. In an internal combustion engine, a plurality of cylinders, a rotary valve comprising a hollow shell having ports adapted to coöperate with a plurality of cylinders, tubes spanning said shell and adapted to serve successively as exhausts for said cylinders, each tube serving a plurality of cylinders, and means to supply gas to the interior of said shell at a point arranged substantially centrally of said cylinders.

13. In an internal combustion engine, a battery of cylinders, a rotary valve connected therewith, feed ports arranged in a ring in the casing of said rotary valve and adapted to serve all the cylinders in said battery, inclined tubes spanning said valve and adapted to exhaust each pair of cylinders in the battery, and an outlet for said inclined tube in either exhausting position.

14. In an internal combustion engine, a plurality of batteries of cylinders, a casing covering all of said cylinders, a rotary valve mounted in said casing, intake ports in said casing arranged with their intake openings in a ring, a port in said valve to successively register with said intake openings, a plurality of discharge tubes for each battery and a centrally arranged gas feed for said valve.

In witness whereof I hereunto subscribe my name to this specification in the presence of two witnesses.

HAROLD R. WELLS.

Witnesses:
I. V. CURRAN,
SEBASTIAN HINTON.